(12) United States Patent
Albl et al.

(10) Patent No.: US 11,549,642 B2
(45) Date of Patent: Jan. 10, 2023

(54) VEHICLE HAVING A STORAGE ASSEMBLY FOR STORING AND DISPENSING A PRESSURISED GAS, AND STORAGE ASSEMBLY FOR A VEHICLE

(71) Applicant: Audi AG, Ingolstadt (DE)

(72) Inventors: Sebastian Albl, Ingolstadt (DE); Franz Hofmann, Ingolstadt (DE); Felix Hochgraeber, Neuendettelsau (DE); Thorsten Schütz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 147 days.

(21) Appl. No.: 17/047,903

(22) PCT Filed: Apr. 18, 2019

(86) PCT No.: PCT/EP2019/060038
§ 371 (c)(1),
(2) Date: Oct. 15, 2020

(87) PCT Pub. No.: WO2019/202058
PCT Pub. Date: Oct. 24, 2019

(65) Prior Publication Data
US 2021/0164615 A1 Jun. 3, 2021

(30) Foreign Application Priority Data
Apr. 19, 2018 (DE) .......................... 102018205967.5

(51) Int. Cl.
*F17C 1/00* (2006.01)

(52) U.S. Cl.
CPC ........ *F17C 1/00* (2013.01); *F17C 2201/0138* (2013.01); *F17C 2201/0171* (2013.01);
(Continued)

(58) Field of Classification Search
CPC .. B60K 2015/0636; B60K 2015/03144; B60K 15/063; F17C 1/00; F17C 13/084; F17C 2205/0138
See application file for complete search history.

(56) References Cited

U.S. PATENT DOCUMENTS

| 4,932,403 A | 6/1990 | Scholley |
| 7,137,409 B2 | 11/2006 | Pouchkarev |

(Continued)

FOREIGN PATENT DOCUMENTS

| CN | 1543548 A | 11/2004 |
| CN | 203666380 U | 6/2014 |

(Continued)

OTHER PUBLICATIONS

International Search Report and Written Opinion of the International Searching Authority directed to related International Patent Application No. PCT/EP2019/060038, dated Jul. 22, 2019, with attached English-language translation; 21 pages.

(Continued)

*Primary Examiner* — Reinaldo Sanchez-Medina
*Assistant Examiner* — Nicole Gardner
(74) *Attorney, Agent, or Firm* — Sterne, Kessler, Goldstein & Fox P.L.L.C.

(57) ABSTRACT

The present disclosure provides a vehicle having a storage assembly for storing and dispensing a pressurized gas. The storage assembly includes a first storage cylinder section and a second storage cylinder section that each have multiple storage cylinders arranged longitudinally parallel to one another in a first layer and at least in a second layer. The storage cylinders are fluidically connected to one another in a meandering manner by a plurality storage cylinder loops. Each of the storage cylinder loops is connected to an axial end of a storage cylinder disposed in the first layer and an (Continued)

axial end of a storage cylinder disposed in the second layer. The storage assembly includes a cross member frictionally connected to the body of the vehicle and arranged in an interstice defined between the first and second storage cylinder sections.

24 Claims, 12 Drawing Sheets

(52) U.S. Cl.
CPC .................. *F17C 2201/056* (2013.01); *F17C 2205/0107* (2013.01); *F17C 2205/0111* (2013.01); *F17C 2205/0138* (2013.01); *F17C 2223/0123* (2013.01); *F17C 2223/036* (2013.01); *F17C 2270/0168* (2013.01)

(56) References Cited

U.S. PATENT DOCUMENTS

| | | | |
|---|---|---|---|
| 7,159,738 B2 | 1/2007 | Luongo | |
| 9,033,085 B1 | 5/2015 | Rawlinson | |
| 9,174,531 B2 | 11/2015 | Finck | |
| 9,217,538 B2 | 12/2015 | Griffith et al. | |
| 9,878,611 B1 | 1/2018 | Abd Elhamid et al. | |
| 10,222,001 B2 | 3/2019 | Croteau et al. | |
| 10,717,356 B2 | 7/2020 | Kataoka et al. | |
| 2011/0300426 A1 | 12/2011 | Iwasa et al. | |
| 2014/0305951 A1 | 10/2014 | Griffith et al. | |
| 2016/0348838 A1 | 12/2016 | Griffith et al. | |
| 2016/0363265 A1 | 12/2016 | Griffith et al. | |
| 2017/0030300 A1 | 2/2017 | Kondogiani et al. | |
| 2017/0291328 A1 | 10/2017 | Wexler et al. | |
| 2017/0327237 A1 | 11/2017 | Saini et al. | |

FOREIGN PATENT DOCUMENTS

| | | |
|---|---|---|
| CN | 105874260 A | 8/2016 |
| CN | 109383278 A | 2/2019 |
| DE | 202006004434 U1 | 6/2006 |
| DE | 102011012496 A1 | 8/2012 |
| DE | 102017117151 A1 | 2/2018 |
| JP | 2001-317689 A | 11/2001 |
| WO | WO 2014/123928 A1 | 8/2014 |

OTHER PUBLICATIONS

International Preliminary Report on Patentability directed to related International Patent Application No. PCT/EP2019/060038, dated Oct. 20, 2020, with attached English-language translation; 18 pages.

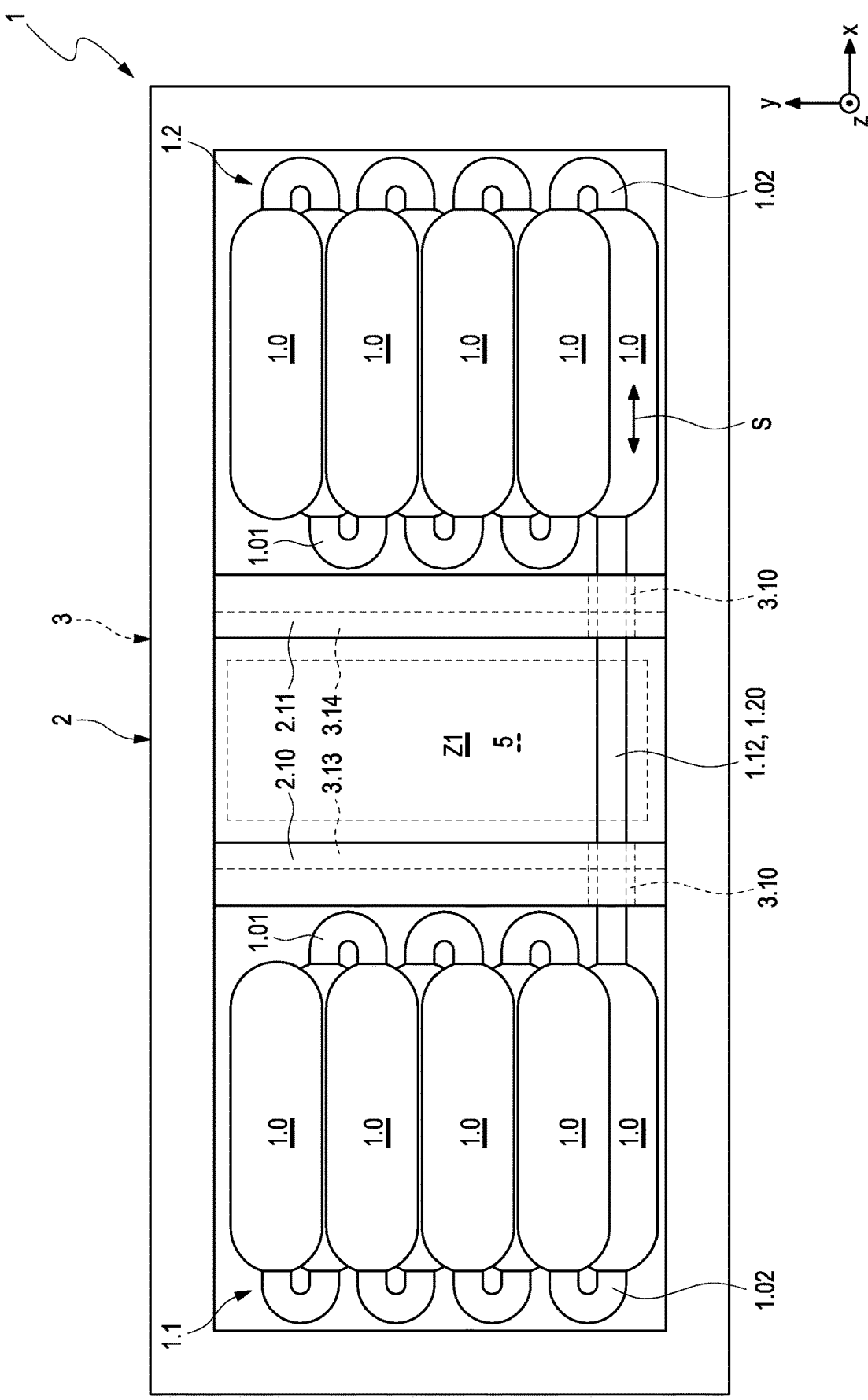

VEHICLE HAVING A STORAGE ASSEMBLY FOR STORING AND DISPENSING A PRESSURISED GAS, AND STORAGE ASSEMBLY FOR A VEHICLE

TECHNICAL FIELD

The invention relates to a vehicle having a storage assembly for storing and dispensing a pressurized gas. The invention also relates to a storage assembly for a vehicle for storing and dispensing a pressurized gas.

BACKGROUND

Assemblies for storing gas under high pressure are known from the general prior art and are used, for example, for storing natural gas or hydrogen. Such storages have a comparatively large diameter in relation to their length and are therefore to be assessed critically with regard to the integration into a vehicle structure because of the associated height.

Therefore, multiple so-called storage cylinders, which are bottle-shaped having a small diameter in relation to the length, are combined to form a modular pressure vessel, as is known, for example, from U.S. Pat. No. 4,932,403 B or U.S. Pat. No. 7,137,409 B2. When integrated into a vehicle, for example in an underbody or trunk, such pressure vessels do not allow any transverse load paths without interrupting the same and without having to use additional connection elements, valves, and protective devices.

In vehicles that are specially configured for an electric drive, a technical space for traction batteries for the electric drive is located below the passenger compartment floor. Such a vehicle is known, for example, from DE 10 2011 012 496 A1 or US 2011/0300426 A1, in which the technical space provided below the passenger compartment floor is divided into two technical sub-spaces, wherein a transverse tunnel is provided under the front seats and under a rear bench seat for further accommodation of traction batteries, so that a footwell is created between the two transverse tunnels in the longitudinal direction of the vehicle.

U.S. Pat. No. 9,033,085 B1 also describes a vehicle in which a battery module is arranged below the passenger compartment floor. This battery module is cut out in the region of the footwell between the front seats and a rear seat bench of the vehicle in the vertical direction of the vehicle, so that a so-called foot garage for accommodating the feet of rear passengers located on the rear seat bench is created.

SUMMARY OF INVENTION

An object of the invention is providing a vehicle having a storage assembly that includes multiple storage cylinders for storing and dispensing a pressurized gas, which is integrated into the body structure of the vehicle with a high level of crash safety. A further object of the invention is to specify a storage assembly made up of multiple storage cylinders for storing and dispensing a pressurized gas, which can be integrated into the body structure of a vehicle with the aim of increased crash safety.

The first-mentioned object is achieved by a vehicle having the features of claim 1.

The embodiment of the vehicle comprises
a storage assembly for storing and dispensing a pressurized gas having the following components:
a first storage cylinder section with multiple storage cylinders which are arranged longitudinally parallel to one another in a first layer and at least in a second layer and are fluidically connected to one another at the axial ends in a meandering manner by means of storage cylinder loops,
at least one second storage cylinder section with multiple storage cylinders which are arranged longitudinally parallel to one another in a first layer and at least in a second layer and are fluidically connected to one another at the axial ends in a meandering manner by means of storage cylinder loops, and
a fluid connection means for fluidically connecting the first and second storage cylinder sections, said fluid connection means fluidically connecting the same axial ends of two adjacent storage cylinders in the first layer or of two adjacent storage cylinders in the second layer, and
a cross member which is frictionally connected to the body of the vehicle and is arranged in an interstice defined between the first and second storage cylinder sections, either flush with the second layer of storage cylinders if the connecting cylinder is flush with the first layer of storage cylinders, or flush with the first layer of storage cylinders if the cylinder connection is flush with second layer of storage cylinders.

In this vehicle having an integrated storage assembly, a transverse support made possible by the body structure is implemented without the storage assembly including multiple storage cylinders having to be interrupted in such a way that no continuous storage volume is created. For this purpose, at least two spaced apart storage cylinder sections are fluidically connected to one another in such a way that a cross member can be passed through in the interstice between the two storage cylinder sections without this cross member having to be cut free for the fluid connection means that connects the two storage cylinder sections, which fluid connection means is preferably designed as a connecting cylinder, since it is also flush with the layer of storage cylinders or forms a common plane in which the fluid connection means does not run.

According to a preferred embodiment of the invention, the storage assembly comprises a cross bar arranged between the first and second storage cylinder sections, which is flush with that first or second layer with which the fluid connection means, which is preferably designed as a connecting cylinder, is also aligned, wherein the fluid connection means fluidically connecting the first to the second storage cylinder section is guided through the cross bar. This cross bar is thus arranged between the two storage cylinder sections in such a way that it is cut free for the fluid connection means at an end region of the cross bar. The storage assembly comprising the first and second storage cylinder sections is preferably framed by a frame support, so that the cross bar can be frictionally connected to the frame support at the end side. Thus, such a storage assembly can be produced from the two storage cylinder sections and the frame support as a separate arrangement, which as such can be frictionally connected to the structure of the body of the vehicle by means of the frame support. Such an arrangement also increases the rigidity of the vehicle body.

According to a further embodiment of the invention, it is particularly advantageous if the cross member and the cross bar are integrally designed. Such an arrangement can be frictionally and directly connected to the structure of the body, whereby a further increase in the rigidity of the body can be achieved.

An improved mechanical connection of the two storage cylinder sections to the frame support is achieved in that at least one rod-shaped fastening support is guided through the openings of the storage cylinder loops located at the same axial end of storage cylinders. Such a fastening support can be frictionally connected at the end side to the frame support. The storage cylinder loops can be connected to the frame support by means of fastening tabs in order to increase the rigidity of the structure made up of the two storage cylinder sections and the frame support.

A further arrangement with the two storage sections can be implemented according to a further embodiment in that the cross member, together with support elements, forms a fastening frame that is congruent to the frame support, wherein the interstices formed by the cross member and the support element by means of cover elements and/or by the interstices formed by the frame elements and the cross bar of the frame support are closed by means of cover elements and the fastening frame is frictionally connected to the frame support or is produced in one piece. Such an arrangement can be mounted directly, for example, on the underbody of the vehicle body.

According to a particularly advantageous embodiment of the invention, it is provided that the cross member including two partial cross members which are parallel and spaced apart from one another with the formation of the interstice. This interstice can be implemented with an extension in the longitudinal direction of the vehicle such that a foot garage for accommodating the feet of rear passengers is created. The cross bar is preferably also formed from two partial cross bars that are flush with the two partial cross members in the vertical direction of the vehicle.

Furthermore, according to a preferred embodiment of the invention, in the interstice between the first and second storage cylinder sections, an intermediate storage cylinder section is provided with multiple storage cylinders arranged longitudinally parallel in at least the first layer, which are fluidically connected in a meandering manner at their axial ends by means of storage cylinder loops. Here, the number of layers of storage cylinders of the intermediate storage cylinder section is smaller by at least one layer compared to the number of layers of the storage cylinder of the first and/or second storage cylinder section, wherein the fluid connection means running in the first layer of storage cylinders including a first connecting cylinder section fluidically connecting the adjacent storage cylinder of the first storage cylinder section and the intermediate storage cylinder section and a second connecting cylinder section fluidically connecting the adjacent storage cylinder of the second storage cylinder section and the intermediate storage cylinder section.

Because the intermediate storage cylinder section between the first and second storage cylinder sections is designed with fewer layers of storage cylinder than the adjacent storage cylinder sections, this storage cylinder section forms a foot garage for accommodating the feet of rear passengers.

It is particularly advantageous here if the storage cylinders of the intermediate storage cylinder section is shortened in their longitudinal direction compared to the storage cylinder of the first and/or second storage cylinder section, whereby in that region of the interstice between the adjacent storage cylinder sections without a storage cylinder a further, but deeper foot garage is created when viewed in the vertical direction of the vehicle.

The storage cylinder can be aligned with the longitudinal direction in the transverse direction of the vehicle or in the longitudinal direction of the vehicle.

The second-mentioned object is achieved by a storage assembly having the features of claim 18.

Such a storage assembly for a vehicle for storing and dispensing a pressurized gas comprises:

a first storage cylinder section with multiple storage cylinders which are arranged longitudinally parallel to one another in a first layer and at least in a second layer and are fluidically connected to one another at the axial ends in a meandering manner by means of storage cylinder loops, at least one second storage cylinder section having multiple storage cylinders which are arranged longitudinally parallel to one another in a first layer and at least in a second layer and are fluidically connected to one another at the axial ends in a meandering manner by means of storage cylinder loops, a fluid connection means for fluidically connecting the first and second storage cylinder sections, said fluid connection means fluidically connecting the same axial ends of two adjacent storage cylinders in the first layer or of two adjacent storage cylinders in the second layer, and an interstice defined between the first and second storage cylinder sections for receiving a cross member of the body of the vehicle, which is either flush with second layer of storage cylinders if the fluid connection means is flush with the first layer of storage cylinders, or is flush with the first layer of storage cylinders if the fluid connection means is flush with second layer of storage cylinders.

In such a storage assembly having at least two spaced apart storage cylinder sections, these are fluidically connected to one another in such a way that a cross member can be passed through in the interstice between the two storage cylinder sections without this cross member having to be cut free for the fluid connection means that connects the two storage cylinder sections, which fluid connection means is preferably designed as a connecting cylinder since it is also flush with that layer of storage cylinders or forms a common plane in which the fluid connection means does not run.

According to a further embodiment, the storage assembly has a frame support which frames the first storage cylinder section and the second storage cylinder section.

With such a frame support and the at least two storage cylinder sections, an arrangement that can be produced independently can be created. The mechanical connection is preferably produced between the two storage cylinder sections and the frame support in that a cross bar is arranged between the first and second storage cylinder section which is aligned with that first or second layer of storage cylinders with which the fluid connection means, which is preferably designed as a connecting cylinder, is also flush, wherein the connecting cylinder is guided through the cross bar as fluid connection means. The cross bar is frictionally connected to the frame support at the end side.

The rigidity of such an arrangement can be further improved if, according to a further embodiment, the storage assembly has at least one rod-shaped fastening support which is guided through the openings of the storage cylinder loops located at the same axial end of storage cylinders and is frictionally connected to the frame support. It is of course also possible to run a further fastening support through the storage cylinder loops on the opposite side.

Furthermore, an independent arrangement for mounting on a vehicle body is created in accordance with an embodiment, in which the cross member, together with support elements, forms a fastening frame that is congruent to the frame support, wherein the interstices formed by the cross member and the support elements by means of cover elements and/or by the interstices formed by the frame elements and the cross bar of the frame support are closed by means of cover elements and the fastening frame is frictionally connected to the frame support or is produced in one piece.

A further advantageous embodiment of the invention is given by the fact that the cross member including two partial cross members which are parallel and spaced apart from one another with the formation of the interstice. This interstice can be implemented with an extension in the vehicle longitudinal direction of the vehicle such that a foot garage for accommodating the feet of rear passengers is created. The cross bar is preferably also formed from two partial cross bars that are flush with the two partial cross members in the vertical direction of the vehicle.

Furthermore, according to a preferred embodiment of the invention, in the interstice between the first and second storage cylinder sections, an intermediate storage cylinder section is provided with multiple storage cylinders arranged longitudinally parallel in at least the first layer, which are fluidically connected in a meandering manner at their axial ends by means of storage cylinder loops. Here, the number of layers of storage cylinders of the intermediate storage cylinder section is smaller by at least one layer compared to the number of layers of the storage cylinder of the first and/or second storage cylinder section, wherein the fluid connection means running in the first layer of storage cylinders including a first connecting cylinder section fluidically connecting the adjacent storage cylinder of the first storage cylinder section and the intermediate storage cylinder section and a second connecting cylinder section fluidically connecting the adjacent storage cylinder of the second storage cylinder section and the intermediate storage cylinder section.

Because the intermediate storage cylinder section between the first and second storage cylinder sections is designed with fewer layers of storage cylinder than the adjacent storage cylinder sections, this storage cylinder section forms a foot garage for accommodating the feet of rear passengers.

Preferably, such a storage assembly having an intermediate storage cylinder section can also be designed in such a way that, in addition to this intermediate storage cylinder section, designed as the first storage cylinder section, only a further storage cylinder section is provided as a second storage cylinder section.

It is particularly advantageous here if the storage cylinders of the intermediate storage cylinder section are shortened in their longitudinal direction compared to the storage cylinder of the first and/or second storage cylinder section, whereby in that region of the interstice between the adjacent storage cylinder sections without a storage cylinder a deeper foot garage is created when viewed in the vertical direction of the vehicle.

The storage assembly according to an embodiment of the invention can also be built with more than two storage cylinder sections, wherein free spaces between each two storage cylinder sections accommodate cross members and/or cross bars of the type described above.

Furthermore, it is possible not only to build the storage cylinder sections from two layers but also from three or more layers.

The storage cylinders of the adjacent layers lie on top of one another to save space in such a way that adjacent storage cylinders from adjacent layers are offset by 60° with respect to their longitudinal axis; i.e., the circular circumference of a storage cylinder is tangential to the circular circumferences of storage cylinders in the adjacent layer. It is of course also possible to store the storage cylinder in another way.

BRIEF DESCRIPTION OF THE FIGURES

Further advantages, features and details of the invention will become apparent from the claims, the following description of preferred embodiments, and from the drawings, in which:

FIG. 14 is a storage assembly according to FIG. 10 in an alternative embodiment.

DETAILED DESCRIPTION OF THE FIGURE

Figure 1:
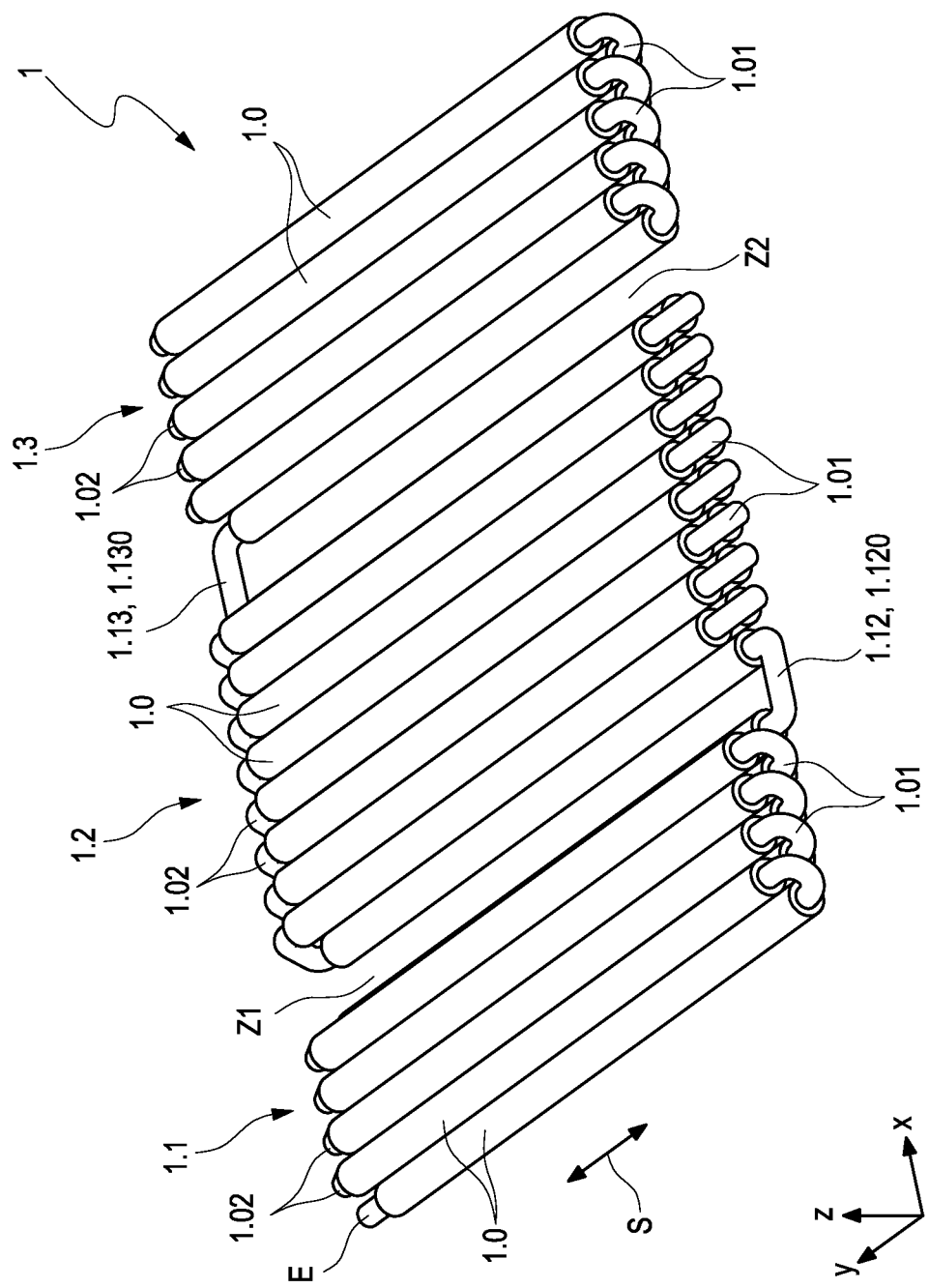
FIG. 1 shows a storage assembly of storage cylinders having three connected storage cylinder sections according to an embodiment.
Figure 2:
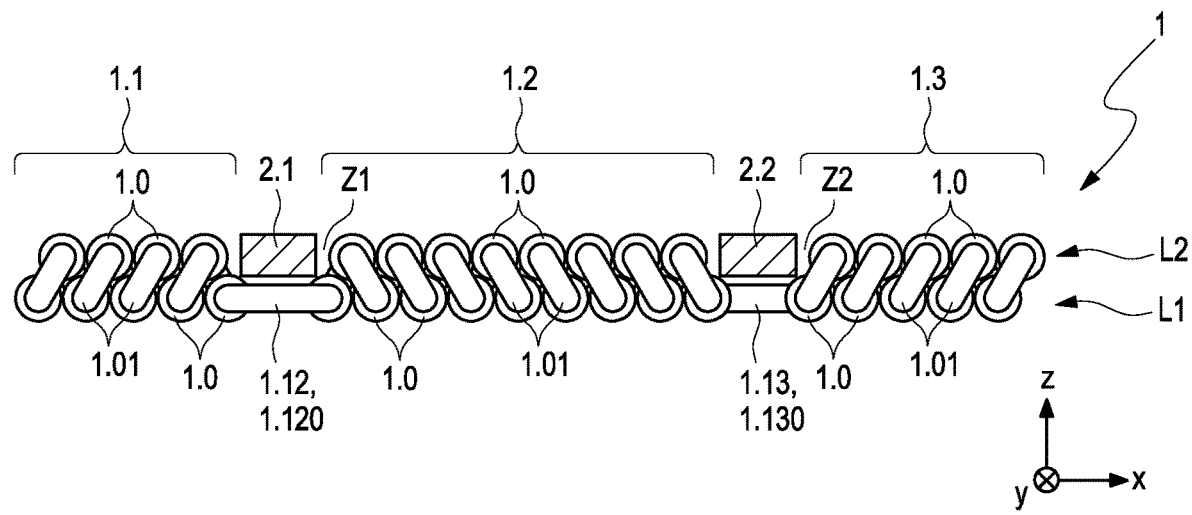
FIG. 2 is a side view of the storage assembly according to FIG. 1 with cross members according to an embodiment.

The storage assembly 1 shown in FIGS. 1 and 2 for a vehicle for storing and dispensing a pressurized gas. The storage assembly 1 includes multiple storage cylinders 1.0, which are each combined in groups to a first storage cylinder section 1.1, a second storage cylinder section 1.2, and a third storage cylinder section 1.3, wherein the first and the second storage cylinder sections 1.1 and 1.2 are fluidically connected via a fluid connection means 1.12 designed as a connecting cylinder 1.120 to form an interstice Z1 and the second and the third storage cylinder sections 1.2 and 1.3 are fluidically connected via a connecting cylinder 1.130 as further fluid connection means 1.13 with formation of an interstice Z2.

Each of the three storage cylinder sections 1.1, 1.2 and 1.3 includes two layers L1 and L2 of storage cylinders 1.0 and are parallel to each other with respect to their longitudinal direction S in such a way that space-saving adjacent storage cylinder from the lower layer L1 and the upper layer L2 are offset by 60° with respect to their longitudinal axis; i.e., the circular circumference of a storage cylinder 1.0 is tangential to the circular circumferences of storage cylinders 1.0 in the adjacent layer L1 or L2.

The storage cylinders 1.0 of the storage cylinder sections 1.1, 1.2, and 1.3 are each fluidically connected at the same axial ends by means of storage cylinder loops 1.01 and 1.02, so that a fluid course is created in a meandering manner. Here, the pressurized gas is, for example, directed upwards from an inlet E of a storage cylinder 1.0 of the lower layer L1 into a directly adjacent storage cylinder device 1.0 of the second layer L2 and then again downwards into a directly adjacent storage cylinder device 1.0 of the first layer, etc.

The connecting cylinder 1.12 connecting the two storage cylinder sections 1.1 and 1.2 connects the same axial ends of the adjacent storage cylinders 1.0 of the first and second storage cylinder sections 1.1 and 1.2 in the first layer L1 and therefore runs horizontally in the plane formed by the first layer L1.

The two storage cylinder sections 1.2 and 1.3 are fluidically connected on the opposite side via the same axial ends of the adjacent storage cylinders 1.0 of the second and third storage cylinder sections 1.2 and 1.3 in the first layer L1 by means of the connecting cylinder 1.13, which also runs horizontally in the plane formed by the first layer L1.

The interstices Z1 and Z2 created by the spaced-apart storage cylinder sections 1.1, 1.2 and 1.3 are used for the installation of cross members 2.1 and 2.2 (cf. FIG. 2) to be connected to the structure of a vehicle body. Here, the two cross members 2.1 and 2.2 are arranged in the interstices Z1 and Z2 in the plane formed by the second layer L2, i.e., they are flush with the storage cylinders 1.0 of the second plane L2 without the region of the connecting cylinders 1.12 and 1.13 being crossed. The cross section of these cross members 2.1 and 2.2 is adapted on the one hand to the distance b1 (cf. FIG. 3) of the two storage cylinders 1.0 adjacent to the interstice Z1 and Z2 in the second layer L2 and on the other hand to the diameter D (cf. FIG. 3) of storage cylinders 1.0 so that the cross members 2.1 and 2.2 do not project beyond the storage cylinders 1.0 of the second layer L2 in their height. For the sake of clarity, the two cross members 2.1 and 2.2 are not shown in the storage assembly 1 according to FIG. 1.

Figure 3:
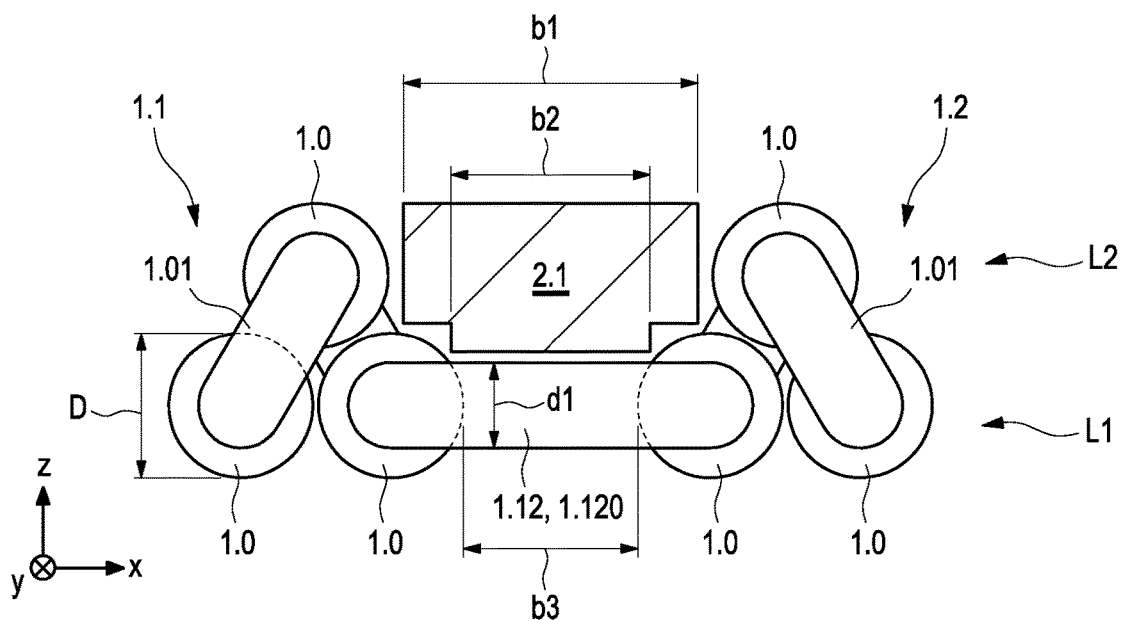
FIG. 3 is a detailed representation of the storage assembly according to FIG. 2 with an alternative cross member according to an embodiment.

An alternative embodiment with regard to the cross-sectional shape of the cross members 2.1 and 2.2 is shown in FIG. 3 on the basis of the cross member 2.1. With this cross member 2.1, the interstice between the storage cylinders 1.0 connected to the connecting cylinder 1.12 is also partially used, since the diameter d1 of the connecting cylinder 1.12 is smaller than the diameter D of a storage cylinder 1.0. Thus, the cross member 2.1 having a T-shaped cross section can be adapted to this interstice Z1, wherein the cross section of the T shape is adapted to the distance b1 of the storage cylinders 1.0 adjacent to the interstice Z1 of the second layer L2 and thus corresponds to the cross section of the cross member 2.1 according to FIG. 2, while the longitudinal section of the T-shape is adapted to the distance b2 between the storage cylinders 1.0 adjacent to the interstice Z1 of the first layer L1 along the edge of the connecting cylinder 1.12 running in the direction of storage cylinders 1.0 of the second layer L2. The distance of the storage cylinders 1.0 between the storage cylinders 1.0 of the first layer L1 is denoted by the reference sign b3, wherein b3<b2 applies.

Figure 4:
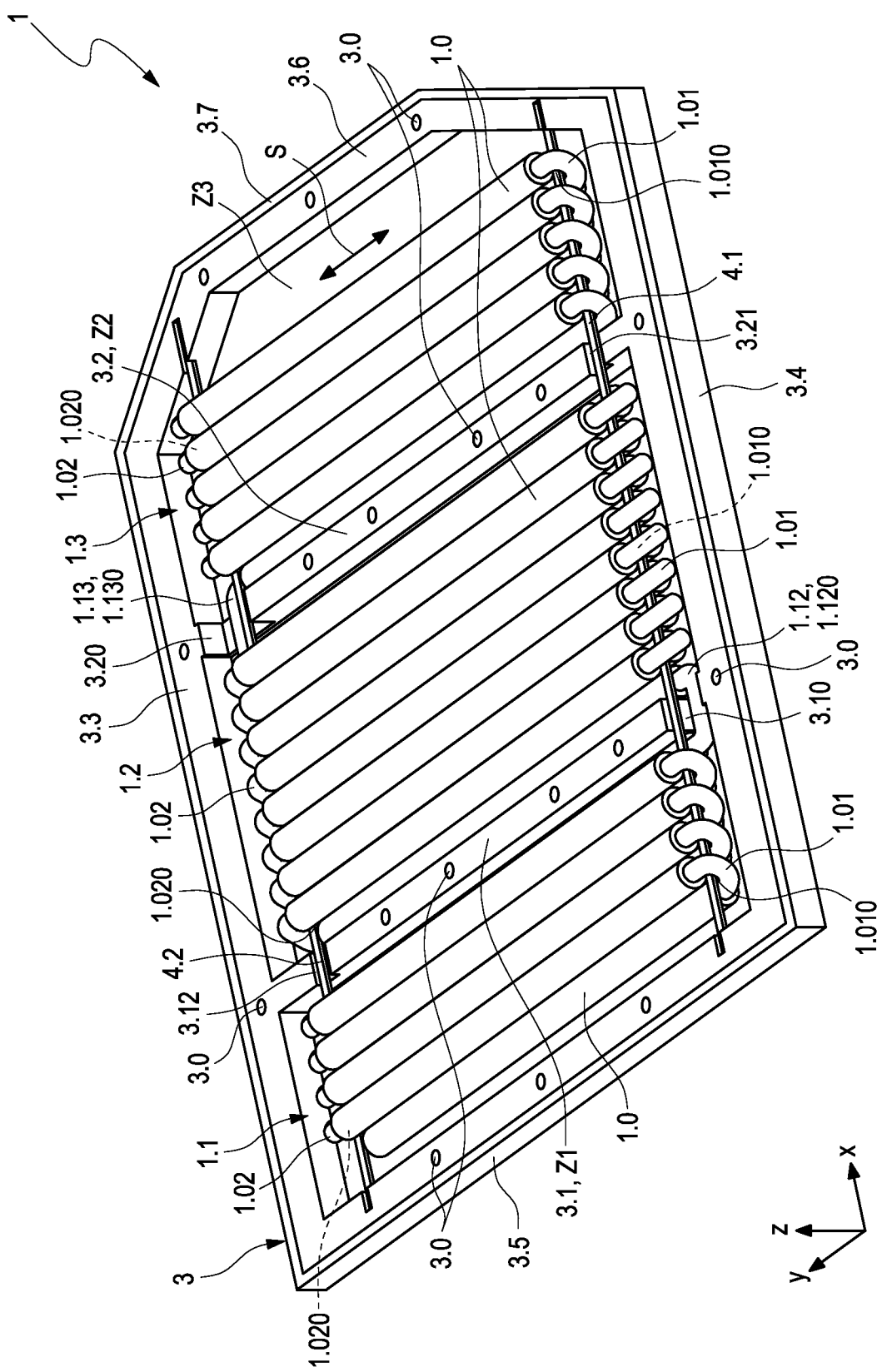
FIG. 4 shows a storage assembly built up as an arrangement according to an embodiment.

FIG. 4 shows a storage assembly 1 designed as an arrangement with the storage cylinders 1.0 shown in FIG. 1. In this storage assembly 1 according to FIG. 4, the storage cylinder units 1.0 are likewise grouped according to FIG. 1 into three storage cylinder sections 1.1, 1.2, and 1.3 to form the interstices Z1 and Z2. These interstices Z1 and Z2 are also bridged at the edge by a connecting cylinder 1.12 and 1.13 which is flush with the first layer, for the fluid connection of the individual storage cylinder sections 1.1, 1.2 and 1.3.

This assembly of the three spaced storage cylinder sections 1.1, 1.2, and 1.3 are framed by a frame support 3, which is substantially designed so as to be rectangular with four frame elements 3.3, 3.4, 3.5, and 3.6. Here, the frame support 3.3 is arranged on one side of the axial ends of storage cylinders 1.0 and the frame support 3.4 is arranged on the opposite side, while the storage cylinder 1.0, the frame supports 3.5 and 3.6 connecting the two frame elements 3.3 and 3.4, extend in the longitudinal direction S.

This frame support 3 further comprises a cross bar 3.1 and a cross bar 3.2, which are arranged in the interstice Z1 between the first and second storage cylinder sections 1.1 and 1.2 and in the interstice Z2 between the second and third storage cylinder sections 1.2 and 1.3 and frictionally connect the two frame elements 3.3 and 3.4 of the frame support 3.

Here, the two cross bars 3.1 and 3.2 run in the plane formed by the first layer L1 of storage cylinders 1.0—i.e., they are flush with the storage cylinders 1.0 of the first level L1—and therefore cross the connecting cylinders 1.12 and 1.13 fluidically connecting the storage cylinder sections 1.1, 1.2 and 1.3. Therefore, the region of the cross bar 3.1 where the connecting cylinder 1.12 is passed through is provided with a cutout 3.10, as can be seen from FIG. 5. As a result, the cross section of the cross bar 3.1 is reduced to a narrow web 3.11, which is frictionally connected to the frame element 3.4.

The cross bar 3.1 is adapted in its cross section to the interstice Z1 between the adjacent storage cylinders 1.0 of the first layer L1 in the first layer L1 so that its width is the distance b3 between these two storage cylinders 1.0 and the height is slightly greater than the diameter D of storage cylinders 1.0 (cf. FIG. 3). Thus, the cross bar 3.1 only protrudes downward by an overhang a beyond the first layer L1, but does not protrude upward in the direction of storage cylinders 1.0 of the second layer L2 beyond the storage cylinders 1.0 of the first layer. In this upward direction, the cross member 2.1 connects with a cross section corresponding to that of FIG. 2. The cross bar 3.1 can thus be produced in one piece together with the cross member 2.1.

If a cross member 2.1 having a cross section designed according to FIG. 3 is used, the height of the cross bar 3.1 is correspondingly reduced, since the cross member 2.1 partially protrudes downward into the first layer L1. In this case, too, this cross bar 3.1, executed in this way, protrudes downward with an overhang a beyond the storage cylinders 1.0 of the first layer L1.

The cross bar 3.2 arranged between the second storage cylinder section 1.2 and the third storage cylinder section 1.3 is designed in a corresponding manner and has a cutout 3.20 for the passage of the connecting cylinder 1.13. The cross section of this cross bar 3.2 is also adapted to the width b3 of the interstice Z2 transversely to the longitudinal direction S of the storage cylinders 1.0 and is slightly greater than the diameter D of storage cylinders 1.0, so that the cross bar 3.2 does not protrude upwards in the direction of the second layer L2 over the storage cylinders 1.0 of the first layer, but protrudes downwards with an overhang a over the storage cylinders 1.0 of the first layer L1.

The frame support 3 is also designed relative to the three storage cylinder sections 1.1, 1.2, and 1.3 such that the frame elements 3.3 to 3.6 in adjustment to the two cross bars 3.1 and 3.2 run in the plane of the first layer L1 of storage cylinders 1.0—i.e., do not protrude upwards over the storage cylinders 1.0 of the first layer L1—but protrude with the same height corresponding to the cross bars 3.1 and 3.2 over the storage cylinders 1.0 of the first layer L1 with the overhang a.

Because the frame support 3 together with the cross bars 3.1 and 3.2 protrudes over the storage cylinders 1.0 of the first layer L1 downwards in the vertical direction of the vehicle, z-direction, the sections between the frame element 3.5 and the cross bar 3.1, between the cross bar 3.1 and the cross bar 3.2, and between the cross bar 3.2 and the frame element 3.2 can be closed by means of cover elements 2.70, 2.80, and 2.90 (cf. FIG. 8), so that when the storage assembly 1 according to FIG. 4 is mounted on the body of a vehicle, the storage cylinders 1.0 are protected from below by cover elements 2.70, 2.80, and 2.90 spaced apart from the same as a base plate, for example by stone chips or uneven floors, and so when a force is applied from below sufficient deformation path is available.

Figure 5:
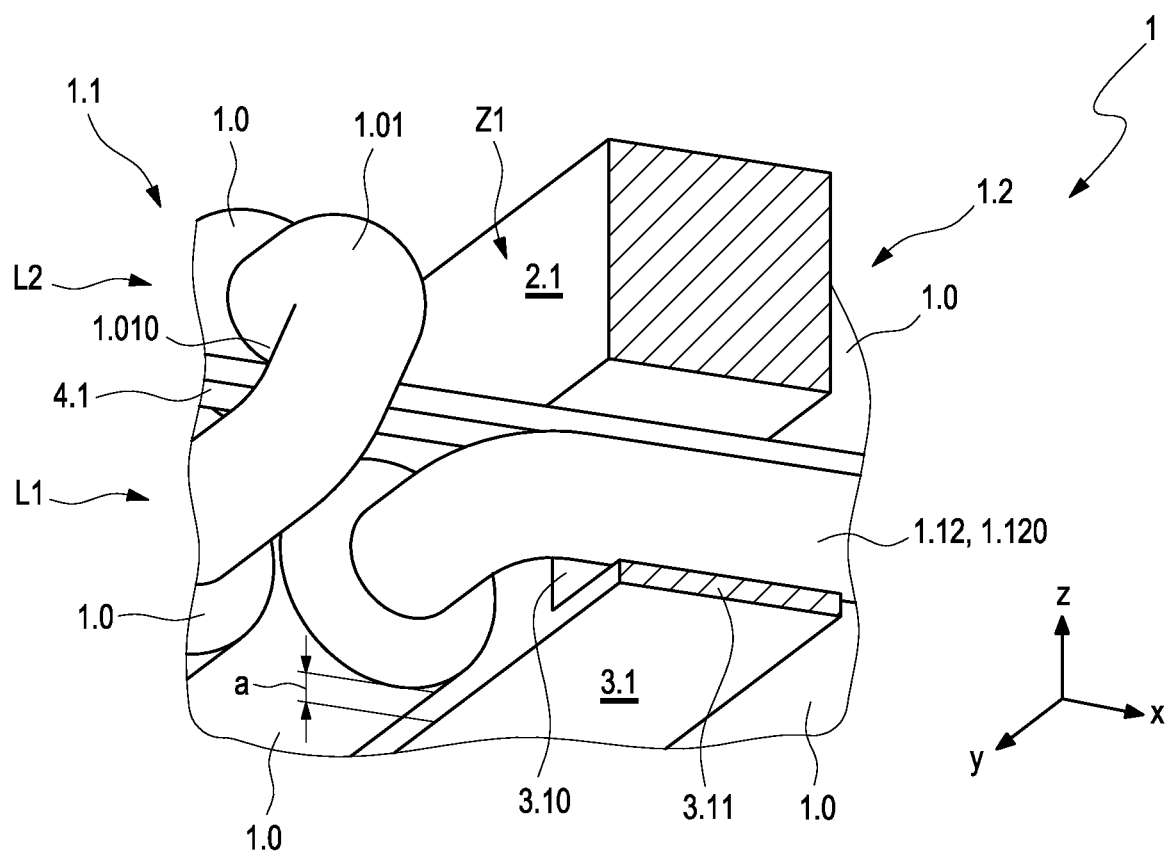
FIG. 5 is a detailed representation of the arrangement according to FIG. 4 with a cross member according to an embodiment.

In FIG. 5, the cross member 2.1 described in FIGS. 1 and 2 is shown, which is flush with the cross bar 3.1 in the interstice Z1 and at the height of storage cylinders 1.0 of the second layer L2, so that the cross member 2.1 does not protrude over the storage cylinders 1.0 of the second layer L2 upwards, i.e., in the opposite direction to the first layer L1. For the sake of clarity, this cross member 2.1 and the cross member 2.2 corresponding to FIG. 2 are not shown in the representation of the storage assembly 1 according to FIG. 4.

The frame support 3 is frictionally connected to the cross members 2.1 and 2.2 via fastening points 3.0 of the two cross bars 3.1 and 3.2.

As an arrangement, the storage assembly 1, having three storage cylinder sections 1.1, 1.2, and 1.3 together with the frame support 3, cannot only be frictionally connected via the cross members 2.1 and 2.2 to the structure of the vehicle body, but also via the frame support 3 by means of fastening points 3.0 provided on the frame elements 3.3, 3.4, 3.5, and 3.6.

The frame element 3.6 of the frame support 3 is not straight according to FIG. 4, but designed with a slight outward bulge so that an installation space Z3 for valves and a pressure control unit is created between the third storage cylinder section 1.3 and the frame element 3.6.

It is also possible to manufacture both the cross member 2.1 and the cross bar 3.1 and also the cross member 2.2 and the cross bar 3.2 in one piece and then connect them to the structure of the vehicle body.

The frame support 3 according to FIG. 4 has, in addition to the frame elements 3.1 to 3.6, a rod-shaped fastening support 4.1 running parallel to the frame element 3.4 and a further rod-shaped fastening support 4.2 running parallel to the frame element 3.3, which are frictionally connected to the frame elements 3.5 and 3.6 at the end side.

Figure 6:
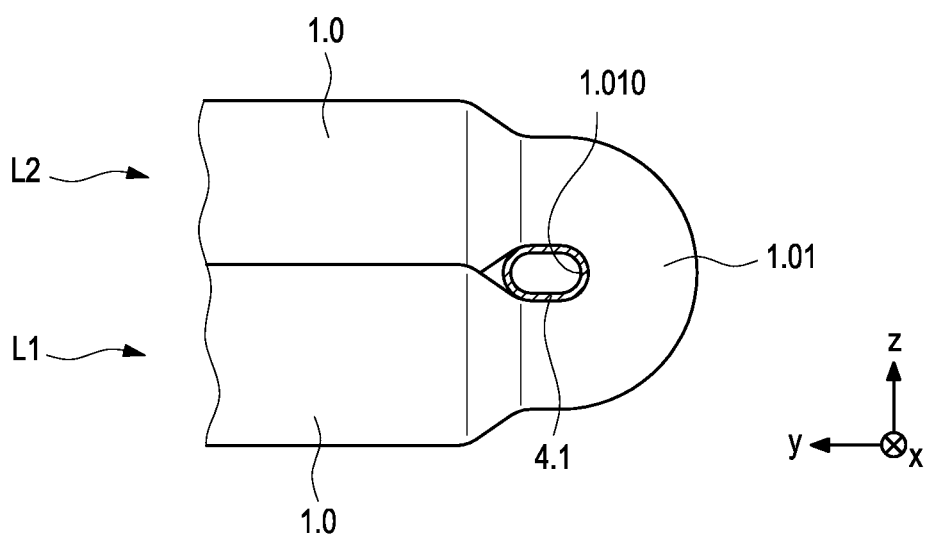
FIG. 6 is a detailed representation of storage cylinders connected via a storage cylinder loop according to an embodiment.

It can also be seen from FIG. 4 that the fastening support 4.1 is guided perpendicular to the longitudinal direction S of the storage cylinders 1.0 through the openings 1.010 of the storage cylinder loops 1.01 located at the same axial end of the storage cylinders 1.0, as shown in detail in FIG. 6. The further fastening support 4.2 is guided through the openings 1.020 of the storage cylinder loops 1.02 located on the opposite side. Here, the cross section of these fastening supports 4.1 and 4.2 is adapted to the contour of the openings 1.010 and 1.020 of the storage cylinder loops 1.01 and 1.02 in accordance with the representation according to FIG. 5.

Since these fastening supports 4.1 and 4.2 run in the plane formed by the storage cylinders 1.0 of the first layer L1, they must be guided through the cross bars 3.1 and 3.2 and have corresponding cutouts for this purpose. In the region of the connecting cylinders 1.12 and 1.13, the existing cutouts 3.10 and 3.20 of the cross bars 3.1 and 3.2 are used for this purpose. At the opposite ends of the cross bars, further cutouts 3.12 and 3.21 are provided for the implementation of the fastening supports 4.1 and 4.2. The cutouts 3.10 and 3.12 in the cross bar 3.1 and the cutouts 3.20 and 3.21 in the cross bar 3.2 can each be configured the same at the end side.

Figure 7:
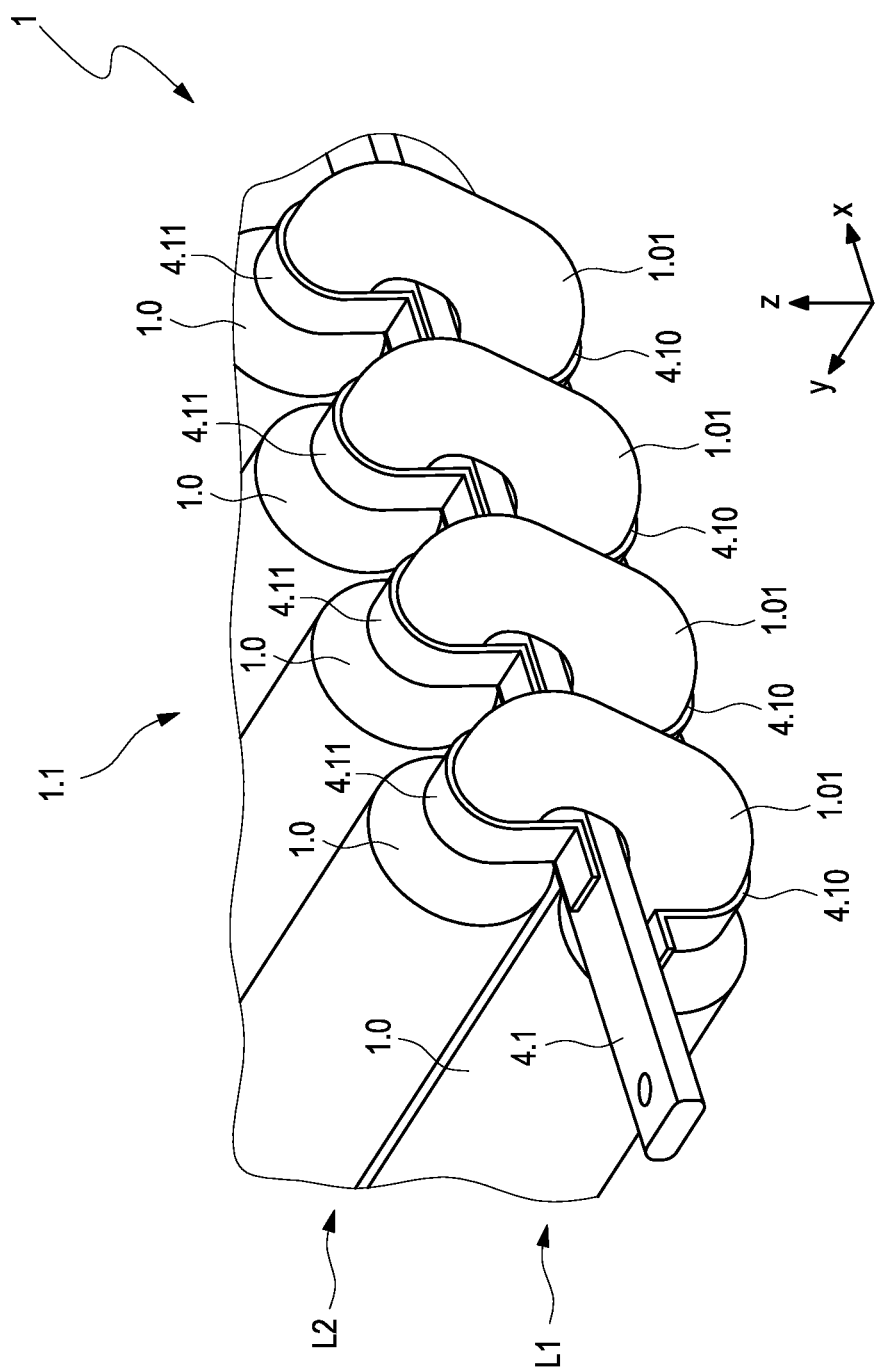
FIG. 7 is a detailed representation of multiple storage cylinders connected via storage cylinder loops of a storage cylinder section according to an embodiment.

The storage cylinder loops 1.01 and 1.02 are frictionally connected to the fastening supports 4.1 and 4.2 by means of fastening tabs 4.10 and 4.11 designed as cylinder clamps, as is shown by way of example for the fastening support 4.1 in FIG. 7. The storage cylinder loops 1.01 are each frictionally connected with fastening tabs 4.10 at their lower end connected to the storage cylinders 1.0 of the first layer L1 to the fastening support 4.1 and, on the other hand, are each frictionally connected with fastening tabs 4.11 at their upper end to the storage cylinders 1.0 of the second layer L2 to the fastening support 4.1.

The storage assembly according to FIG. 4, designed as an arrangement, is connected to the structure of the vehicle body via the cross members 2.1 and 2.2 and thus integrated into the same, for example by the frame support 3 being frictionally connected to the underbody of the vehicle body via fastening points 3.0. In addition, a seal 3.7 for sound-proofing can be provided on the frame elements 3.3 to 3.6 of the frame support.

Figure 8:
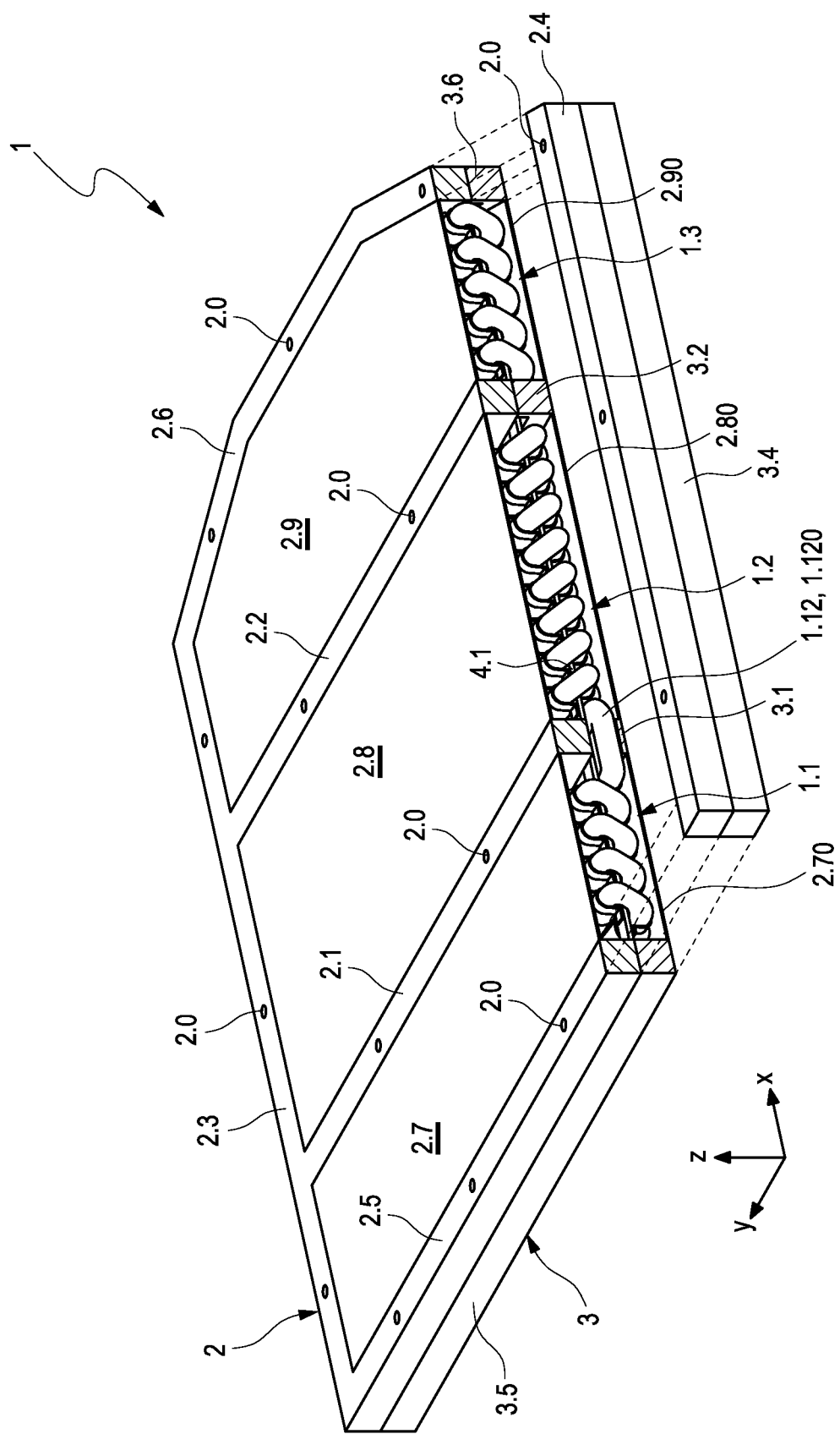
FIG. 8 shows a storage assembly according to FIG. 4 having a fastening frame according to an embodiment.

FIG. 8 shows a further embodiment of the storage assembly 1 as an arrangement for installation and integration into a vehicle body. Starting from the storage assembly 1 according to FIG. 4, a fastening frame 2 having a structure that is congruent to the frame carrier 3 is connected to this frame support 3.

In addition to the two cross members 2.1 and 2.2, this fastening frame 2 comprises support elements 2.3, 2.4, 2.5 and 2.6 in accordance with the representations according to FIGS. 2, 3 and 4. This fastening frame 2 is placed with its carrier elements 2.3 to 2.6 on the frame support 3 in such a way that the individual support elements 2.3 to 2.6 are congruent on the corresponding frame elements 3.3 to 3.6 of the frame support 3; this of course also applies to the two cross members 2.1 and 2.2 and the two cross bars 3.1 and 3.2. The fastening frame 2 thus lies in the plane of the second layer L2 formed by the storage cylinders 1.0. The interstices formed by the support elements 2.3 to 2.6 and the cross members 2.1 and 2.2 are closed by means of cover elements 2.7, 2.8, and 2.9. Thus the cover element 2.7 closes the region between the cross member 2.1 and the support element 2.5, the cover element 2.8 closes the region between the two cross members 2.1 and 2.2, and finally the cover element 2.9 closes the region between the cross member 2.2 and the support element 2.6.

Alternatively or additionally, the interstices between the frame element 3.5 and the cross bar 3.1, between the cross bar 3.1 and the cross bar 3.2, and between the cross bar 3.2 and the frame element 2.6 of the frame support 3 can be covered with cover elements 2.70, 2.80, and 2.90. These cover elements 2.70, 2.80, and 2.90 form a base plate with a sufficient distance to the storage cylinders 1.0 of the first layer L1, since the frame support 3 together with the cross bars 3.1 and 3.2 protrudes over the storage cylinders 1.0 of the first layer L1 downwards in the vertical direction of the vehicle, z-direction, corresponding to the overhang a (cf. FIG. 5). Thus, when a force acts from below on the vehicle—i.e., on the storage assembly 1 according to FIG. 8—there is sufficient deformation path to avoid damage to the storage cylinders 1.0.

The fastening frame 2 has fastening points 2.0, via which the storage assembly 1 according to FIG. 7 is frictionally connected to supports of the vehicle body.

Furthermore, it is also possible to form the fastening frame 2 together with the frame support 3 in one piece.

Finally, the storage assembly 1 according to FIG. 4 and thus also according to FIG. 8 can also be designed with only two storage cylinder sections 1.1 and 1.2, so that only one cross member 2.1 or only one cross bar 3.1 is required for the frame support 3 or the fastening frame 2.

This storage assembly 1 according to FIG. 8, designed as an arrangement, assumes a structural function in the vehicle, in that this arrangement can absorb high forces via the components 2.1 to 2.6 of the fastening frame 2, also via the cross bars 3.1 and 3.2, both in the longitudinal direction of the vehicle (x-direction) and in the transverse direction of the vehicle (y-direction).

Figure 9:
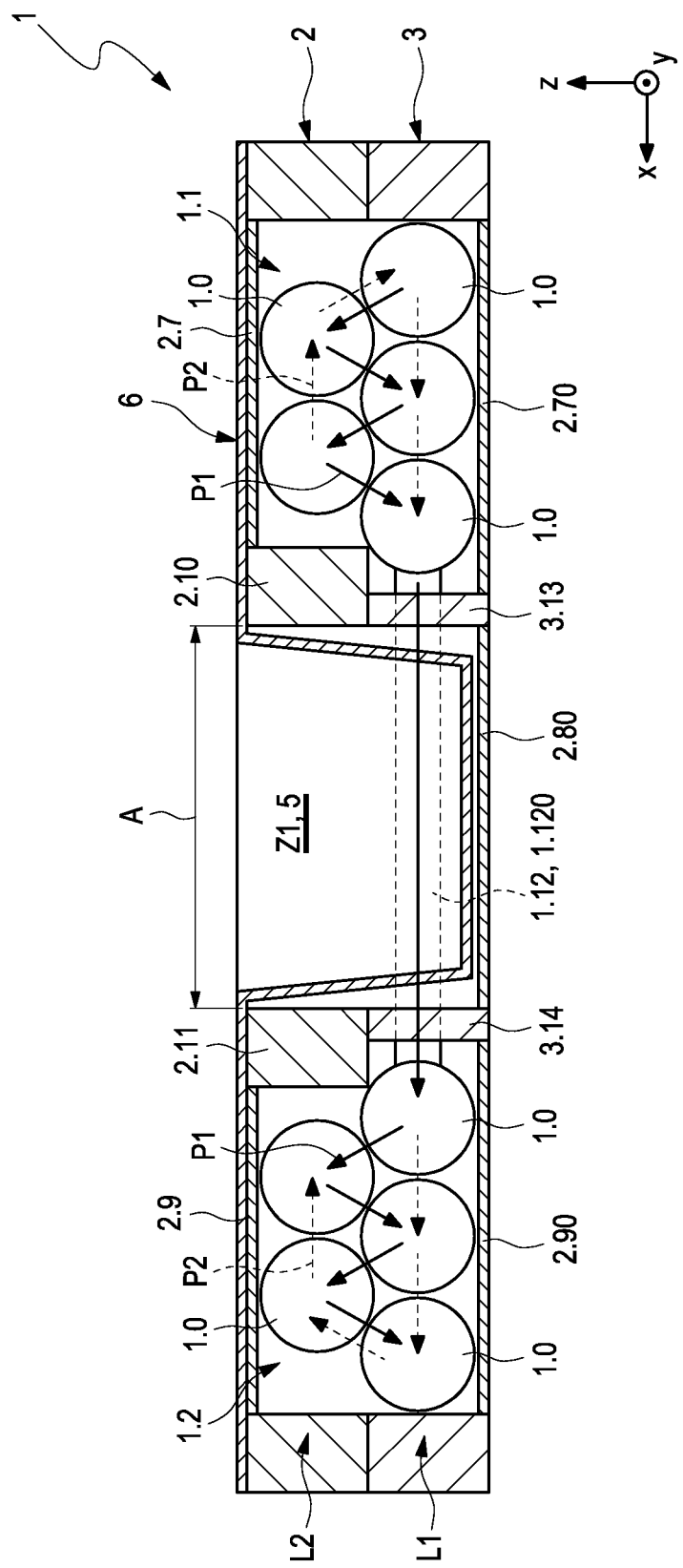
FIG. 9 is a sectional view of a storage assembly according to FIG. 8 in an alternative embodiment with a foot garage according to section IX-IX according to FIG. 10.
Figure 10:
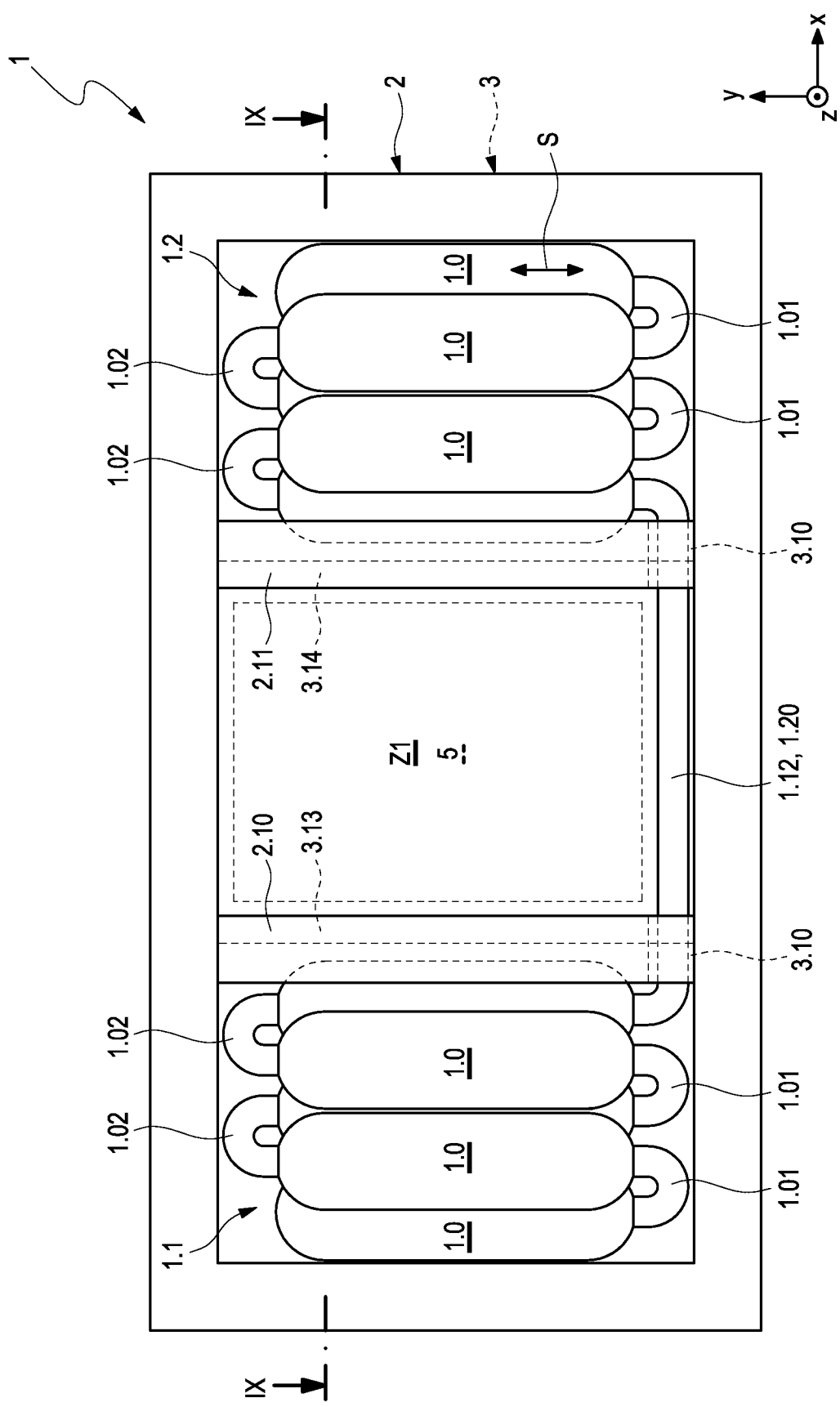
FIG. 10 is a plan view of a storage assembly according to FIG. 9 according to an embodiment.

An alternative embodiment of the storage assembly 1 according to FIG. 8 is shown in FIGS. 9 and 10, wherein this storage assembly 1 only has two storage cylinder sections, namely a first storage cylinder section 1.1 and a second storage cylinder section 1.2.

In this storage assembly 1 according to FIGS. 9 and 10, the cross member 2.1 of the storage assembly 1 according to FIG. 8 separating the two storage cylinder sections 1.1 and 1.2 includes two partial cross members 2.10 and 2.11, which are arranged at a distance A to one another to form the interstice Z1 in the longitudinal direction of the vehicle (x-direction). The two partial cross members 2.10 and 2.11 also run in the plane of the second layer L2 of storage cylinders 1.0 of the two storage cylinder sections 1.1 and 1.2 corresponding to the cross member 2.1 of the storage assembly 1 according to FIG. 4 or FIG. 8. The two storage cylinder sections 1.1 and 1.2 are fluidically connected by means of a fluid connection means 1.12 designed as a connecting cylinder 1.120, the length of the connecting cylinder 1.120 being adapted to the distance A so that the interstice Z1 is bridged.

As can be seen from FIGS. 9 and 10, the storage assembly 1 also has a cross bar 3.1 which includes two partial cross bars 3.13 and 3.14 running in the plane of the first layer L1 of storage cylinders 1.0 of the two storage cylinder sections 1.1 and 1.2, which are each flush with a partial cross member 2.10 and 2.11 in the vertical direction of the vehicle (z-direction). The connecting cylinder 1.120 runs in the plane of the first layer L1 of storage cylinders 1.0 of the two storage cylinder sections 1.1 and 1.2, and thereby breaks through the two partial cross bars 3.13 and 3.14, which have corresponding cutouts 3.10.

The partial cross bars 3.13 and 3.14, together with frame elements 3.3 to 3.6 (cf. FIG. 4), form the frame support 3. The partial cross members 2.10 and 2.11, together with the support elements 2.3 to 2.6 (cf. FIG. 8), form the fastening frame 2. The frame support 3 can also be made in one piece together with the fastening frame 2 and form a housing for the storage cylinders 1.0.

When this storage assembly 1 according to FIGS. 9 and 10 is integrated in a vehicle, the region of the interstice Z1 is located between the front seats and a rear seat bench of the vehicle and forms a foot garage 5 for the rear passengers to accommodate their feet. In FIG. 9, the course of a passenger compartment floor 6 of the vehicle is shown schematically, the interstice Z1 forming the foot garage 5.

The storage cylinders 1.0 of the two storage cylinder sections 1.1 and 1.2 are each connected to storage cylinder loops 1.01 and 1.02, wherein according to FIGS. 9 and 10, the storage cylinders 1.0 of the first layer L1 and the second layer L2 are alternately connected, as indicated by the arrows P1 according to FIG. 9. The storage cylinders 1.0 of the respective storage cylinder sections 1.1 and 1.2 can also be fluidically connected in layers, as shown by the arrows P2 (shown in dashed lines) according to FIG. 9.

The interstice Z1 used as footwell 5 (e.g. foot garage) according to the storage assembly 1 according to FIGS. 9 and 10 can also be used to arrange further storage cylinders 1.0 in the plane of the first layer L1, whereby a foot garage 5 with a smaller depth in the vertical direction of the vehicle is created.

Figure 11:
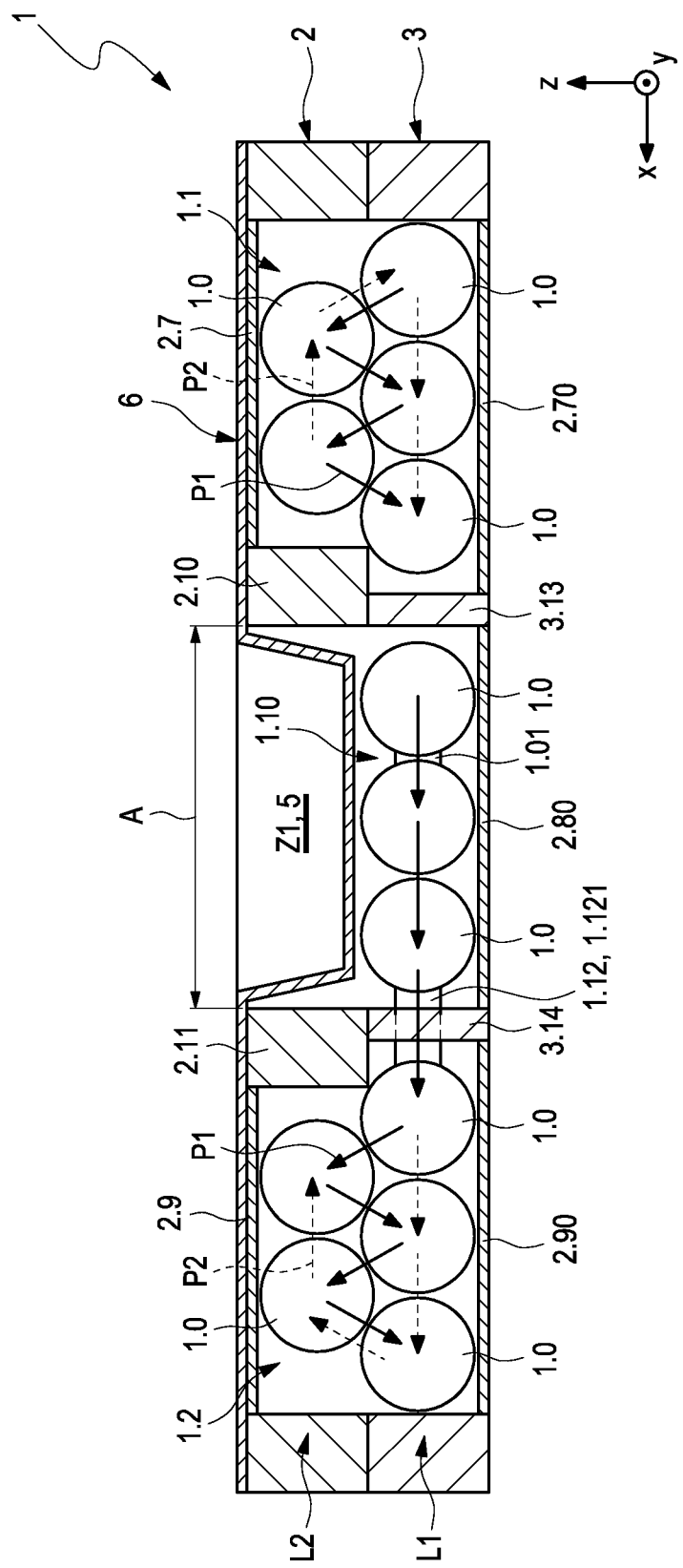
FIG. 11 is a sectional view of a storage assembly according to FIG. 9 in an alternative embodiment according to section IX-IX according to FIG. 12.
Figure 12:
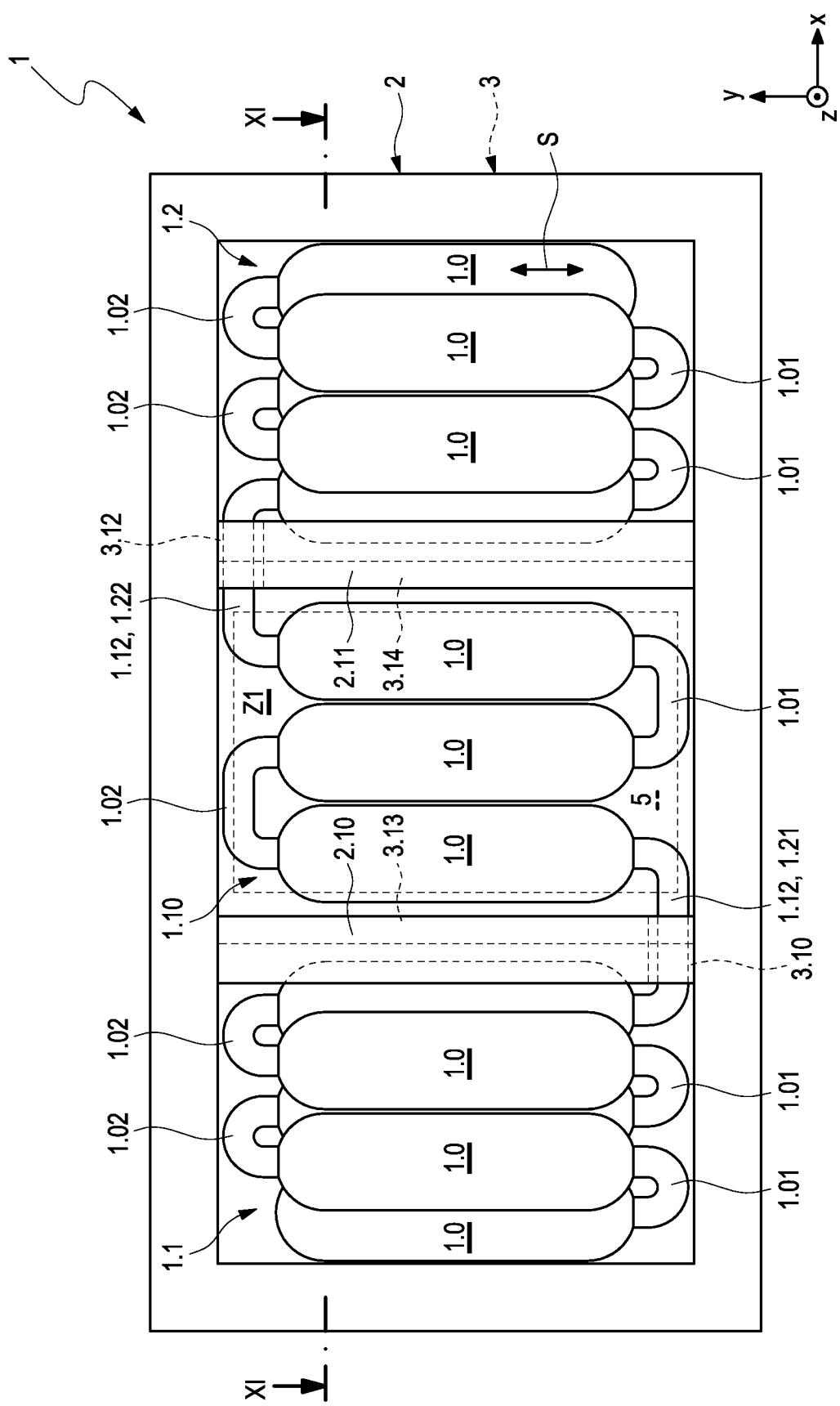
FIG. 12 is a plan view of a storage assembly according to FIG. 11 according to an embodiment.

Such a storage assembly 1 is shown in FIGS. 11 and 12, in which an intermediate storage cylinder section 1.10 with, for example, three storage cylinders 1.0 is arranged in the interstice Z1. These storage cylinders 1.0 of the intermediate storage cylinder section 1.10 lie in the plane of the first layer L1 and are fluidically connected in a meandering manner by means of storage cylinder loops 1.01 and 1.02.

As a result, since the first and second storage cylinder sections 1.1 and 1.2 each including two layers L1 and L2 of storage cylinders 1.0 are built up, a foot garage 5 is created in the interstice Z1 because the storage cylinders 1.0 of the intermediate storage cylinder section 1.10 are reduced by one layer compared to the storage cylinder section 1.1 and 1.2, as can be seen from the course of a schematically indicated passenger compartment floor 6.

The fluid connection of the intermediate storage cylinder section 1.10 having the adjacent storage cylinder sections 1.1 and 1.2 takes place by means of a fluid connection means 1.12, which, as the first connecting cylinder section 1.121, fluidically connects the adjacent storage cylinders 1.0 of the first storage cylinder section 1.1 and the intermediate storage cylinder section 1.10 and which, as the second connecting cylinder section 1.122, fluidically connects the adjacent storage cylinders 1.0 of the second storage cylinder section 1.2 and the intermediate storage cylinder section 1.10. The two connecting cylinder sections 1.121 and 1.122 are guided over cutouts 3.10 and 3.12 of the partial cross bars 3.13 and 3.14.

The storage cylinders 1.0 of the two storage cylinder sections 1.1 and 1.2 are each connected with storage cylinder loops 1.01 and 1.02, wherein according to FIGS. 11 and 12, the storage cylinders 1.0 of the first layer L1 and the second layer L2 are alternately connected, as indicated by the arrows P1 according to FIG. 11. The storage cylinders 1.0 of the respective storage cylinder sections 1.1 and 1.2 can also be fluidically connected in layers, as shown by the arrows P2 (shown in dashed lines) according to FIG. 11.

The frame support 3 and the fastening frame 2 of the storage assembly 1 having the partial cross bars 3.13 and 3.14 and the partial cross members 2.10 and 2.11 are constructed in accordance with that of the storage assembly according to FIG. 9 and FIG. 10 and form a housing for the storage cylinders 1.0.

The storage cylinder sections 1.1 and 1.2 of the storage assembly 1 according to FIGS. 11 and 12 can of course also be designed with more than two layers of storage cylinders 1.0. In order to form a corresponding foot garage 5, the intermediate storage cylinder section 1.10 is designed with a number of layers of storage cylinders 1.0 reduced by the value of at least 1.

The storage assembly 1 according to FIGS. 11 and 12 can also be carried out without the first or second storage cylinder section 1.1 or 1.2 so that the storage assembly 1 is produced from the intermediate storage cylinder section 1.10 as a first storage cylinder section with the foot garage 5 and a further storage cylinder section is produced as a second storage cylinder section 1.2.

Figure 13:
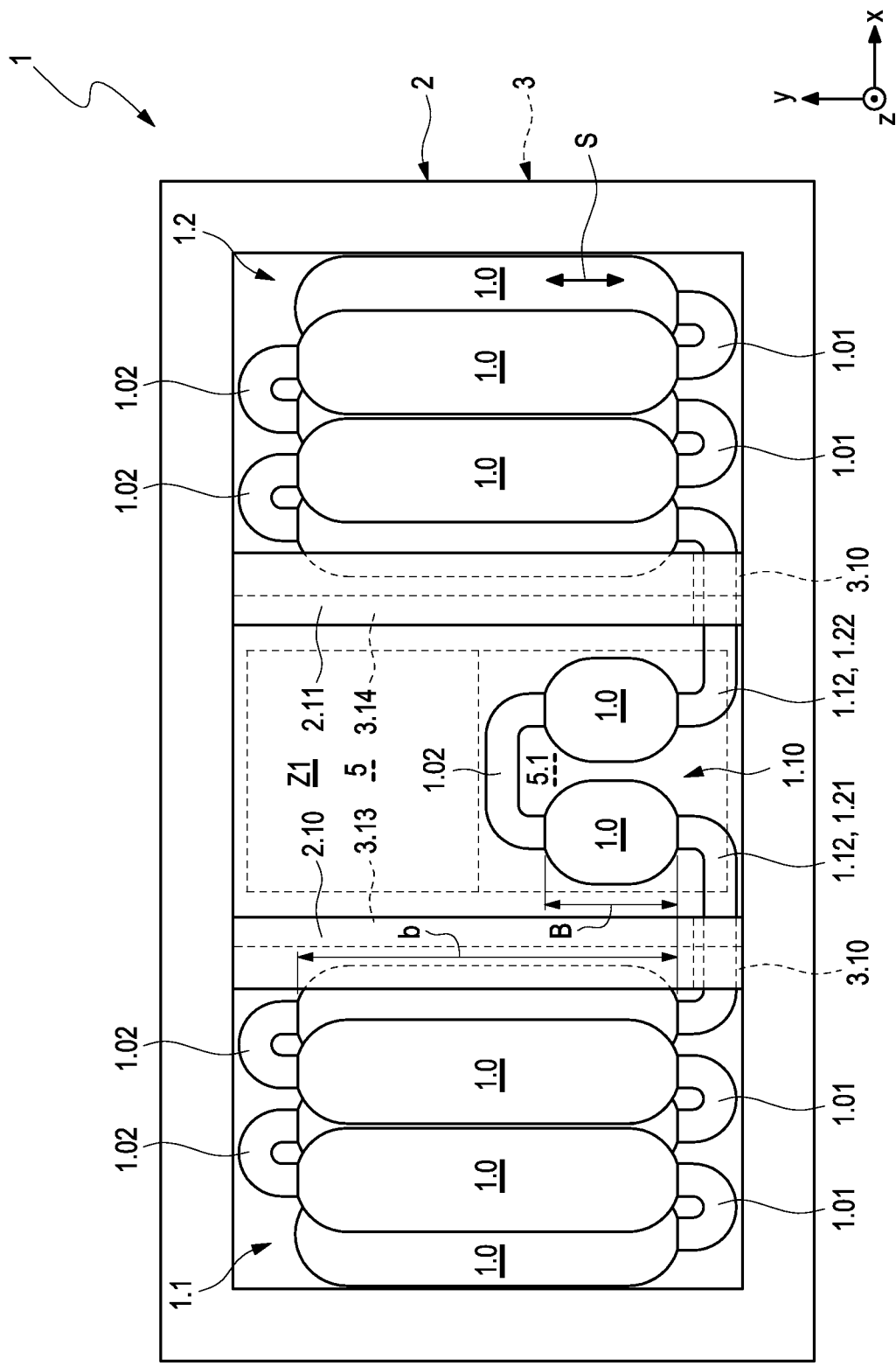
FIG. 13 is a plan view of a storage assembly according to FIG. 12 in an alternative embodiment.

FIG. 13 shows an alternative storage assembly 1 to the storage assembly 1 according to FIGS. 11 and 12 with an intermediate storage cylinder section 1.10 likewise arranged in the interstice Z1 having two storage cylinders 1.0. The difference to the storage assembly 1 according to FIGS. 11 and 12 is that the two storage cylinders 1.0 of the intermediate storage cylinder section 1.10 in their longitudinal direction S—i.e., in the transverse direction of the vehicle (y-direction)—are carried out with a length B which is shorter compared to the length b of storage cylinders 1.0 of the two storage cylinder sections 1.1 and 1.2; thus B<b applies.

This creates a foot garage 5, seen in the vertical direction of the vehicle, above the storage cylinders 1.0 of the intermediate storage cylinder section 1.10 and a foot garage 5.1 in the remaining region of the interstice Z1, in which no storage cylinders 1.0 are located. The foot garage 5.1 thus has a greater depth in the vertical direction of the vehicle than the foot garage 5.

Also in this storage assembly 1 according to FIG. 13, the storage cylinder sections 1.1 and 1.2 are designed with more than two layers of storage cylinders 1.0. The intermediate storage cylinder section 1.10 then has at least a number of layers of storage cylinders 1.0 reduced by the value of 1.

Finally, the storage assembly 1 according to FIG. 13, corresponding to the storage assembly 1 according to FIGS. 11 and 12 can also be carried out without the first and second storage cylinder section 1.1 or 1.2 so that the storage assembly 1 is produced from the intermediate storage cylinder section 1.10 as a first storage cylinder section with the foot garage 5 and 5.1 and a further storage cylinder section is produced as a second storage cylinder section 1.2.

FIG. 14 shows an alternative storage assembly 1 to the storage assembly 1 according to FIGS. 9 and 10, in which, in contrast to that according to FIG. 10, the storage cylinders 1.0 of the first and second storage cylinder section 1.1 and 1.2 are aligned with their longitudinal direction S perpendicular to the partial cross members 2.10 and 2.11 and thus also perpendicular to the partial cross bars 3.13 and 3.14, i.e., in the longitudinal direction of the vehicle (x-direction).

The interstice Z1 remains free of storage cylinders and forms a foot garage 5.

The storage cylinders 1.0 of the storage cylinder sections 1.1 and 1.2 are connected in a meandering manner by means of storage cylinder loops 1.01 and 1.02. According to FIG. 14, the storage cylinder loops 1.01 and 1.02 each connect adjacent storage cylinders 1.0 of the first and second layers L1 and L2. It is of course also possible to connect the storage cylinders 1.0 in one layer.

According to FIG. 14, storage cylinders 1.0 of the two storage cylinder sections 1.1 and 1.2, which are flush with one another on the edge, are fluidically connected by means of a fluid connection means 1.12 designed as a connecting cylinder 1.120. This connecting cylinder 1.120 is guided over cutouts 3.10 of the partial cross bars 3.13 and 3.14.

REFERENCE SIGNS

1 Storage assembly
1.0 Storage cylinder of the storage assembly 1
1.01 Storage cylinder loop
1.010 Opening of the storage cylinder loop 1.01
1.02 Storage cylinder loop
1.020 Opening of the storage cylinder loop 1.02
1.1 first storage cylinder section of storage assembly 1
1.10 Intermediate storage cylinder section
1.12 Fluid connection means
1.120 Connecting cylinder
1.121 first connecting cylinder section
1.122 second connecting cylinder section
1.13 Fluid connection means
1.130 Connecting cylinder
1.2 second storage cylinder section of storage assembly 1
1.3 third storage cylinder section of storage assembly 1
2 Fastening frame
2.0 Fastening point of the fastening frame 2
2.1 Cross member
2.10 Partial cross member of the cross member 2.1
2.11 Partial cross member of the cross member 2.1
2.2 Cross member
2.3 Support element of the fastening frame 2
2.4 Support element of the fastening frame 2
2.5 Support element of the fastening frame 2
2.6 Support element of the fastening frame 2
2.7 Cover element of the fastening frame 2
2.70 Cover element
2.8 Cover element of the fastening frame 2
2.80 Cover element
2.9 Cover element of the fastening frame 2
2.90 Cover element
3 Frame support
3.0 Fastening point of the frame support 3
3.1 Cross bar of the frame support 3
3.10 Cutout of the cross bar 3.1
3.11 Bar of the cross bar 3.1 at the cutout 3.10
3.12 further cutout of the cross bar 3.1
3.13 Partial cross bar of the cross bar 3.1
3.14 Partial cross bar of the cross bar 3.1
3.2 Cross bar of the frame support 3
3.20 Cutout of the cross bar 3.2
3.21 Further cutout of the cross bar 3.2
3.3 Frame element of the frame support 3
3.4 Frame element of the frame support 3
3.5 Frame element of the frame support 3
3.6 Frame element of the frame support 3
3.7 Seal
4.1 Fastening support of the frame support 3
4.10 Fastening tab
4.11 Fastening tab
4.2 Fastening support of the frame support 3
5 Foot garage
6 Passenger compartment floor of a vehicle
A Distance
a Overhang
B Length
b Length
b1 Distance
b2 Distance
b3 Distance
d1 Diameter
D Diameter
S Longitudinal direction of storage cylinders 1.0
E Input of a storage cylinder 1.0
Z1 Interstice
Z2 Interstice
Z3 Installation space within the frame support 3

The invention claimed is:

1. A vehicle comprising:
a storage assembly for storing and dispensing a pressurized gas, wherein the storage assembly comprises:
a first storage cylinder section comprising a plurality of first storage cylinders arranged longitudinally parallel to one another in a first layer and a second layer, and a plurality of first storage cylinder loops fluidically connecting the plurality of first storage cylinders to one another, wherein each of the plurality of first storage cylinder loops is connected at an axial end of a first storage cylinder disposed in the first layer of the first storage cylinder section and an axial end of a first storage cylinder disposed in the second layer of the first storage cylinder section;

a second storage cylinder section comprising a plurality of second storage cylinders arranged longitudinally parallel to one another in a first layer and a second layer, and a plurality of second storage cylinder loops fluidically connecting the plurality of second storage cylinders to one another, wherein each of the second cylinder loops is connected to an axial end of a second storage cylinder disposed in the first layer of the second storage cylinder section and an axial end of a second storage cylinder disposed in the second layer of the second storage cylinder section;

a fluid connecting cylinder fluidically connecting the first and second storage cylinder sections, wherein the fluid connecting cylinder fluidically connects an axial end of a first storage cylinder disposed adjacent to the second storage cylinder section to an axial end of a second storage cylinder disposed adjacent to the first storage cylinder section, and the first storage cylinder and the second storage cylinder connected by the fluid connecting cylinder are both located in either the first layer or the second layer; and a cross member frictionally connected to a body of the vehicle and arranged in an interstice between the first and second storage cylinder sections, wherein the cross member does not project in a vertical direction beyond either the second layer of the plurality of first and second storage cylinders or the first layer of the plurality of first and second storage cylinders, and the cross member and the fluid connecting cylinder are disposed in opposite layers.

2. The vehicle according to claim 1, wherein the storage assembly comprises a cross bar arranged between the plurality of first and second storage cylinder sections, and both the cross bar and the fluid connecting cylinder are aligned with the first layer of the plurality of first and second storage cylinders or the second layer of the first and second storage cylinders, wherein the fluid connecting cylinder extends through a cutout of the cross bar.

3. The vehicle according to claim 2, wherein the storage assembly comprises a frame support framing the first storage cylinder section and the second storage cylinder section.

4. The vehicle according to claim 3, wherein an end side of the cross bar is frictionally connected to the frame support.

5. The vehicle according to claim 3, wherein the frame support is frictionally connected to the cross member.

6. The vehicle according to claim 2, wherein the cross member and the cross bar are integrally formed as a single piece.

7. The vehicle according to claim 3, wherein the frame support is frictionally connected to the body of the vehicle.

8. The vehicle according to claim 3, further comprising:
a rod-shaped fastening support extending through an opening of each of the first and second storage cylinder loops located at a same axial end of the plurality of first and second storage cylinders.

9. The vehicle according to claim 8, wherein an end side of the rod-shaped fastening support is frictionally connected to the frame support.

10. The vehicle according to claim 3, wherein the storage assembly comprises a fastening frame comprising the cross member, a plurality of support elements, and a plurality of cover elements, and the fastening frame is congruent to the frame support and frictionally connected to the frame support, wherein the cross member and the plurality of support elements of the fastening frame define a plurality of interstices covered by the plurality of cover elements, and wherein the frame support comprises the cross bar, a plurality of frame elements, and a plurality of cover elements, and the frame elements and the cross bar of the frame support define a plurality of interstices covered by the plurality of cover elements.

11. The vehicle according to claim 1, wherein the cross member comprises a first partial cross member and a second cross member extending parallel to each other and spaced apart such that the interstice is defined between the first partial cross member and the second cross member.

12. The vehicle according to claim 11, wherein the cross bar comprises a first partial cross bar and a second partial cross bar, and the first partial cross bar is disposed flush against the first partial cross member and the second partial cross bar is disposed flush against the second partial cross member.

13. A vehicle, comprising:
a storage assembly for storing and dispensing a pressurized gas, wherein the storage assembly comprises:
a first storage cylinder section comprising a plurality of first storage cylinders arranged longitudinally parallel to one another in a first layer and a second layer, and a plurality of first storage cylinder loops fluidically connecting the plurality of first storage cylinders to one another, wherein each of the first cylinder loops is connected to an axial end of a first storage cylinder disposed in the first layer of the first storage cylinder section and an axial end of a first storage cylinder disposed in the second layer of the first storage cylinder section;

a second storage cylinder section comprising a plurality of second storage cylinders arranged longitudinally parallel to one another in a first layer and a second layer, and a plurality of second storage cylinder loops fluidically connecting the plurality of second storage cylinders to one another, wherein each of the second cylinder loops is connected to an axial end of a second storage cylinder disposed in the first layer of the second storage cylinder section and an axial end of a second storage cylinder disposed in the second layer of the second storage cylinder section;

an intermediate storage cylinder section arranged in an interstice defined between the first storage cylinder section and the second storage cylinder section, and the intermediate storage cylinder section includes a plurality of intermediate storage cylinders arranged longitudinally parallel to each other in a first layer, and the plurality of intermediate storage cylinders are fluidically connected to one another by a plurality of intermediate storage cylinder loops; and a fluid connection section comprising a first fluid connecting cylinder fluidically connecting a first storage cylinder disposed adjacent to the intermediate storage cylinder section to an intermediate storage cylinder disposed adjacent to the first storage cylinder section, and a second fluid connecting cylinder fluidically connecting a second storage cylinder disposed adjacent to the intermediate storage cylinder section to an intermediate storage cylinder disposed adjacent to the second storage cylinder section, wherein the intermediate storage cylinder section includes a number of layers of the plurality of intermediate storage cylinders that is at least one layer less than a number of layers of the plurality of first and second storage cylinders in the first and second storage cylinder sections.

14. The vehicle according to claim 13, wherein the first layer of the plurality of intermediate storage cylinders of the intermediate storage cylinder section comprises a length that is less than a length of the plurality of first storage cylinders and that is less than a length of the plurality of second storage cylinders.

15. The vehicle according to claim 13, wherein the plurality of first, second, and intermediate storage cylinders extend in a transverse direction with respect to the vehicle.

16. The vehicle according to claim 13, wherein the plurality of first, second, and intermediate storage cylinders extend in a longitudinal direction with respect to the vehicle.

17. A storage assembly for storing and dispensing a pressurized gas in a vehicle, comprising:
a first storage cylinder section comprising a plurality of first storage cylinders arranged longitudinally parallel to one another in a first layer and a second layer and a plurality of first storage cylinder loops fluidically connecting the plurality of first storage cylinders to one another, wherein each of the first cylinder loops is connected at an axial end of a first storage cylinder disposed in the first layer of the first storage cylinder section and an axial end of a first storage cylinder disposed in the second layer of the first storage cylinder section;
a second storage cylinder section comprising a plurality of second storage cylinders arranged longitudinally parallel to one another in a first layer and a second layer, and a plurality of second storage cylinder loops fluidically connecting the plurality of second storage cylinders to one another, wherein each of the second cylinder loops is connected at an axial end of a second storage cylinder disposed in the first layer of the second storage cylinder section and an axial end of a second storage cylinder disposed in the second layer of the second storage cylinder section;
a fluid connecting cylinder fluidically connecting the first and second storage cylinder sections, wherein the fluid connecting cylinder fluidically connects an axial end of a first storage cylinder disposed adjacent to the second storage cylinder section to an axial end of a second storage cylinder disposed adjacent to the first storage cylinder section, and the first storage cylinder and the second storage cylinder connected by the fluid connecting cylinder are both located in either the first layer or the second layer; and
a cross member frictionally connected to a body of the vehicle and arranged at an interstice disposed between the first and second storage cylinder sections, wherein the cross member does not project in a vertical direction beyond either the second layer of the plurality of first and second storage cylinders or the first layer of the plurality of first and second storage cylinders, and the cross member and the fluid connecting cylinder are disposed in opposite layers.

18. The storage assembly according to claim 17, further comprising:
a frame support framing the first storage cylinder section and the second storage cylinder section.

19. The storage assembly according to claim 18, further comprising:
a cross bar arranged between the first and second storage cylinder sections, and both the cross bar and the fluid connecting cylinder are aligned with the first layer of the plurality of first and second storage cylinders or the second layer of the plurality of first and second storage cylinders,
wherein the fluid connecting cylinder extends through a cutout of the cross bar, and an end side of the cross bar is frictionally connected to the frame support.

20. The storage assembly according to claim 18, further comprising:
a rod-shaped fastening support extending through an opening of each of the first and second storage cylinder loops located at a same axial end of the plurality of first and second storage cylinders, and the rod-shaped fastening support is frictionally connected to the frame support.

21. The storage assembly according to claim 19, further comprising:
a fastening frame comprising the cross member, a plurality of support elements, and a plurality of cover elements, and the fastening frame is congruent to the frame support,
wherein the cross member and the support elements define a plurality of interstices covered by the plurality of cover elements, and
wherein the frame elements and the cross bar of the frame support define a plurality of interstices covered by the plurality of cover elements, and the fastening frame is frictionally connected to the frame support.

22. The storage assembly according to claim 17, wherein the cross member comprises a first partial cross member and a second partial cross member extending parallel and spaced apart such that the interstice is defined between the first and second partial cross members.

23. The storage assembly according to claim 22, further comprising:
an intermediate storage cylinder section arranged in the interstice between the first storage cylinder section and the second storage cylinder section, and the intermediate storage cylinder section includes a plurality of intermediate storage cylinders arranged longitudinally parallel to each other in a first layer, and the plurality of intermediate storage cylinders are fluidically connected to one another by a plurality of intermediate storage cylinder loops,
wherein the intermediate storage cylinder section includes a number of layers of the plurality of intermediate storage cylinders that is at least one layer less than a number of layers in the first and second storage cylinder sections, and
wherein the fluid connection includes a first connecting cylinder fluidically connecting a first storage cylinder disposed adjacent to the intermediate storage cylinder section to an intermediate storage cylinder disposed adjacent to the first storage cylinder section, and a second connecting cylinder fluidically connecting a second storage cylinder disposed adjacent to the intermediate storage cylinder section to an intermediate storage cylinder disposed adjacent to the second storage cylinder section.

24. The storage assembly according to claim 23, wherein the first layer of the plurality of intermediate storage cylinders of the intermediate storage cylinder section comprises a length that is less than a length of the plurality of first storage cylinders and that is less than a length of the plurality of second storage cylinders.

* * * * *